(12) United States Patent
Gillespie et al.

(10) Patent No.: US 11,604,884 B2
(45) Date of Patent: Mar. 14, 2023

(54) SYSTEM AND METHOD FOR STORING AND READING ENCRYPTED DATA

(71) Applicant: Dell Products L.P., Hopkinton, MA (US)

(72) Inventors: Kurt D. Gillespie, Round Rock, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 17/070,534

(22) Filed: Oct. 14, 2020

(65) Prior Publication Data
US 2022/0114263 A1    Apr. 14, 2022

(51) Int. Cl.
| | |
|---|---|
| G06F 15/177 | (2006.01) |
| G06F 9/00 | (2006.01) |
| G06F 21/60 | (2013.01) |
| G06F 21/62 | (2013.01) |
| G06F 9/4401 | (2018.01) |
| H04L 9/32 | (2006.01) |
| G06F 21/57 | (2013.01) |
| G06F 16/23 | (2019.01) |
| G06F 21/64 | (2013.01) |

(52) U.S. Cl.
CPC .......... *G06F 21/602* (2013.01); *G06F 9/4401* (2013.01); *G06F 16/2379* (2019.01); *G06F 21/575* (2013.01); *G06F 21/62* (2013.01); *G06F 21/64* (2013.01); *H04L 9/32* (2013.01); *G06F 2221/034* (2013.01)

(58) Field of Classification Search
CPC .. G06F 21/602; G06F 9/4401; G06F 16/2379; G06F 21/575; G06F 21/62; G06F 21/64; G06F 2221/034; G06F 21/78; H04L 9/32; H04L 2209/30; H04L 9/0637; H04L 9/3242
See application file for complete search history.

(56) References Cited

U.S. PATENT DOCUMENTS

| | | | |
|---|---|---|---|
| 9,716,711 B2 * | 7/2017 | Porter | G06F 21/645 |
| 2008/0114994 A1 * | 5/2008 | Iyer | G06F 12/1408 |
| | | | 713/193 |
| 2015/0234448 A1 * | 8/2015 | Ichida | G06F 3/0625 |
| | | | 711/114 |
| 2019/0026442 A1 * | 1/2019 | Perlman | H04L 9/3247 |
| 2021/0184848 A1 * | 6/2021 | Roowalla | G06F 11/1438 |

* cited by examiner

*Primary Examiner* — Xuxing Chen
(74) *Attorney, Agent, or Firm* — Chamberlain, Hrdlicka, White, William & Aughtry

(57) ABSTRACT

An information handling system includes a general storage for storing application data of applications hosted by the information handling system. The information handling system also includes a management storage for storing management data used to manage operation of the information handling system. The information handling system further includes a management storage manager that obtains data for storage in the management storage; encrypts the data to obtain encrypted data and authentication data for the encrypted data; generates error correction code data for the encrypted data and the authentication data; and stores, as a new record, the encrypted data, the authentication data, and the error correction code data in the management storage.

17 Claims, 10 Drawing Sheets

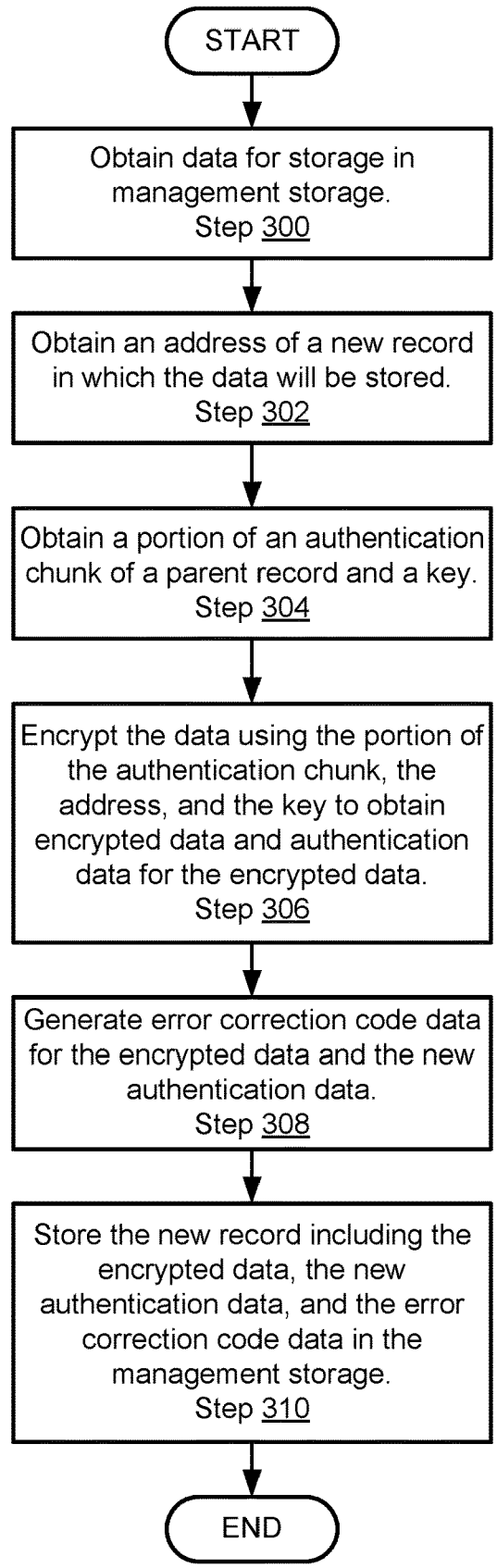
FIG. 3.1

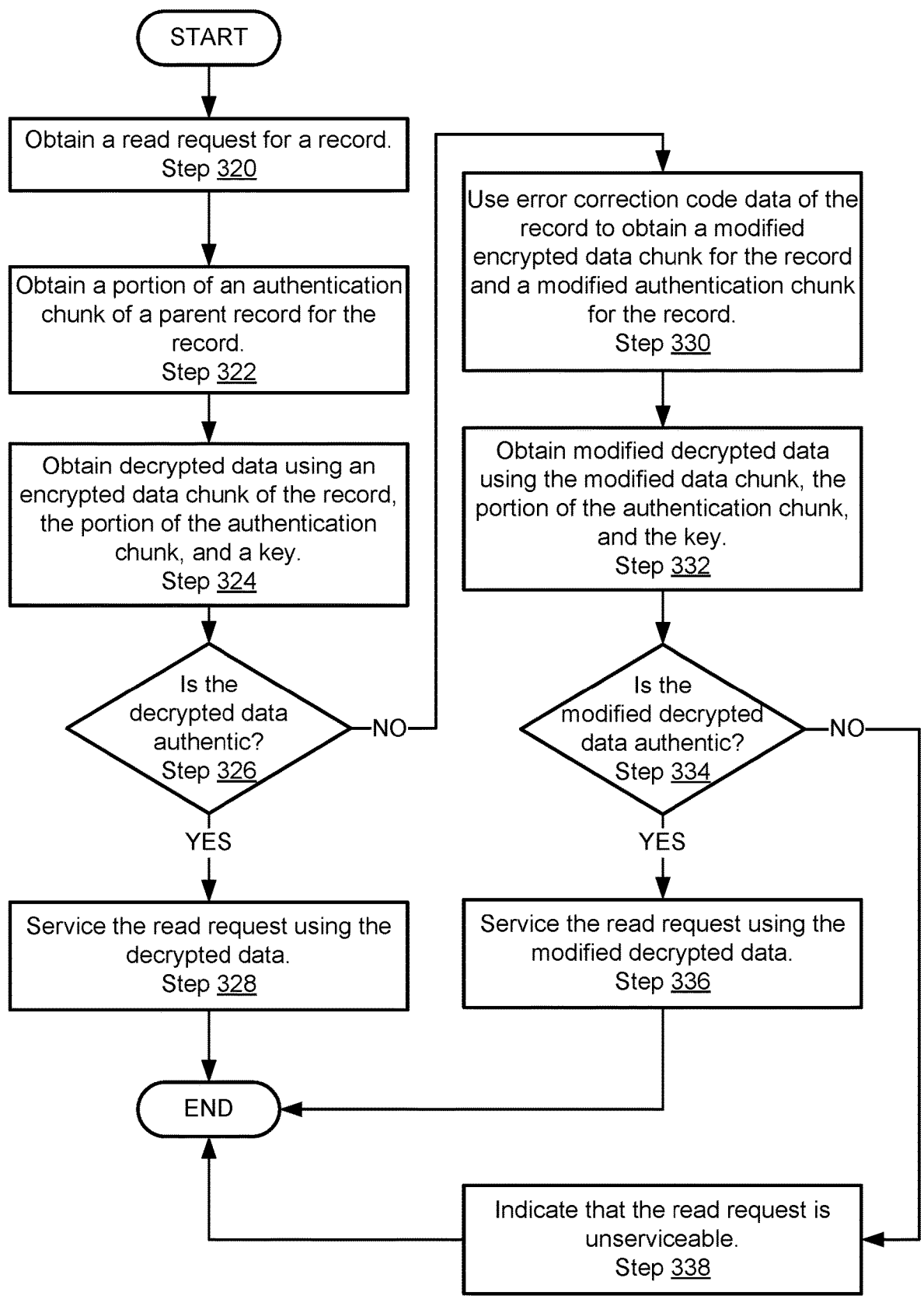
FIG. 3.2

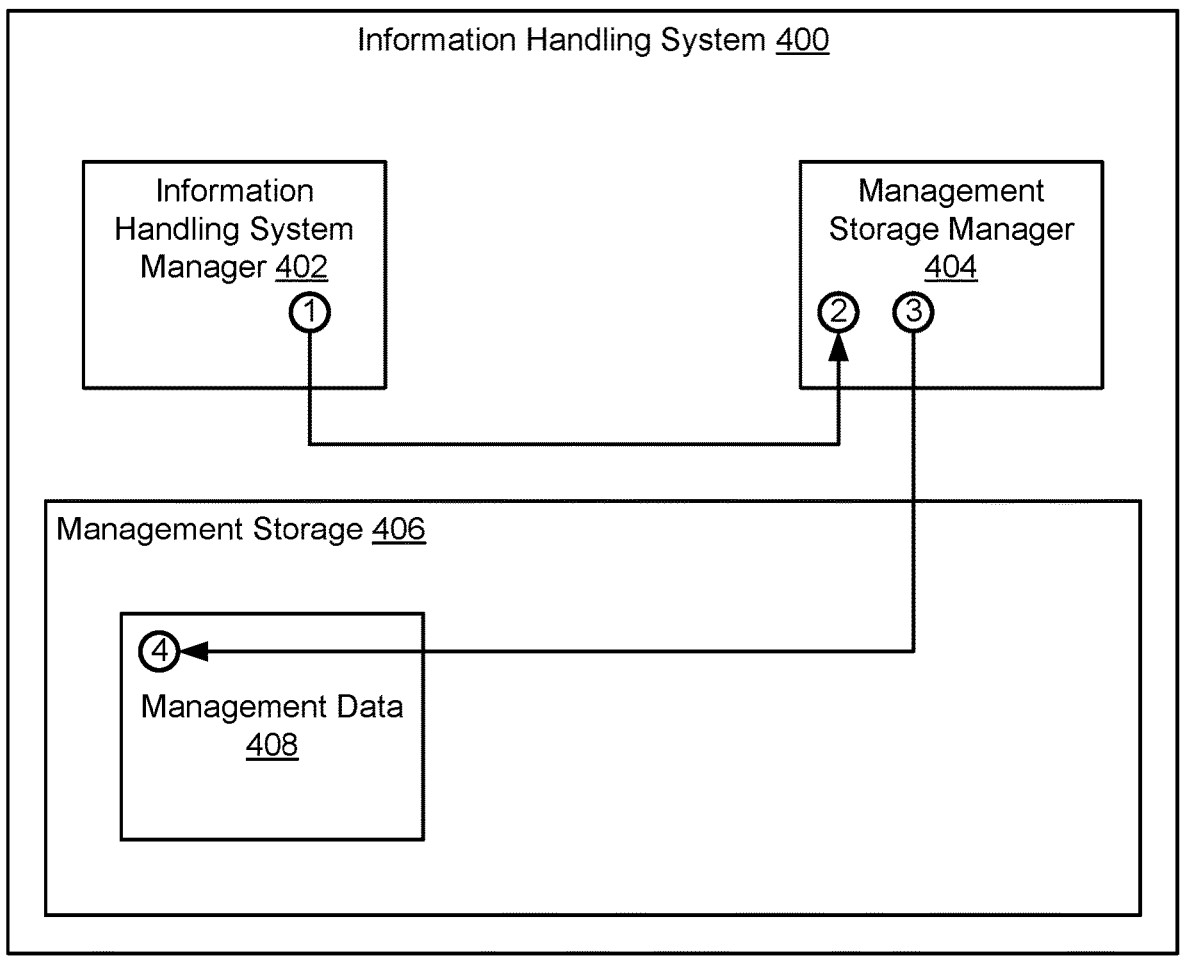
FIG. 4.1

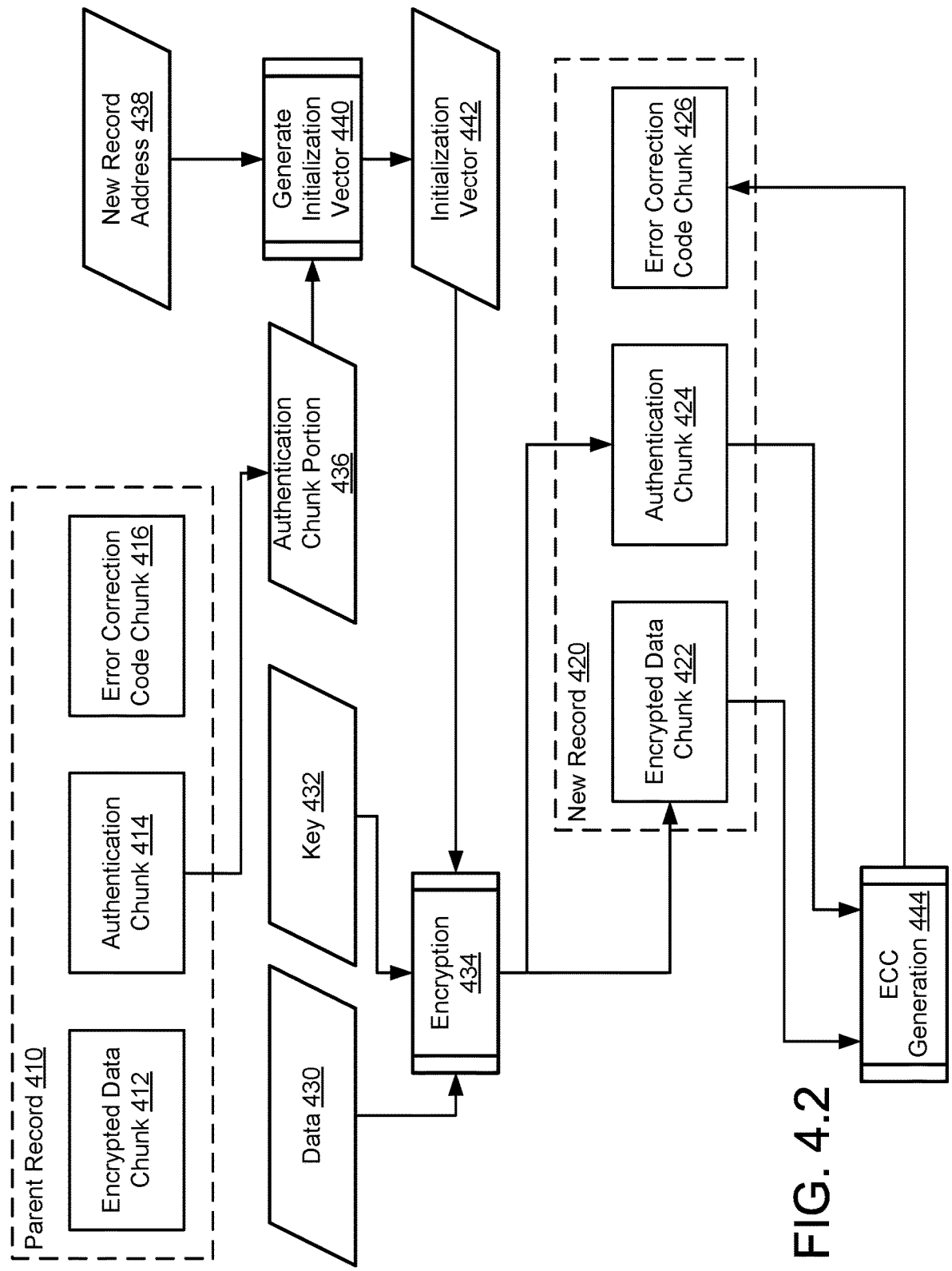
FIG. 4.2

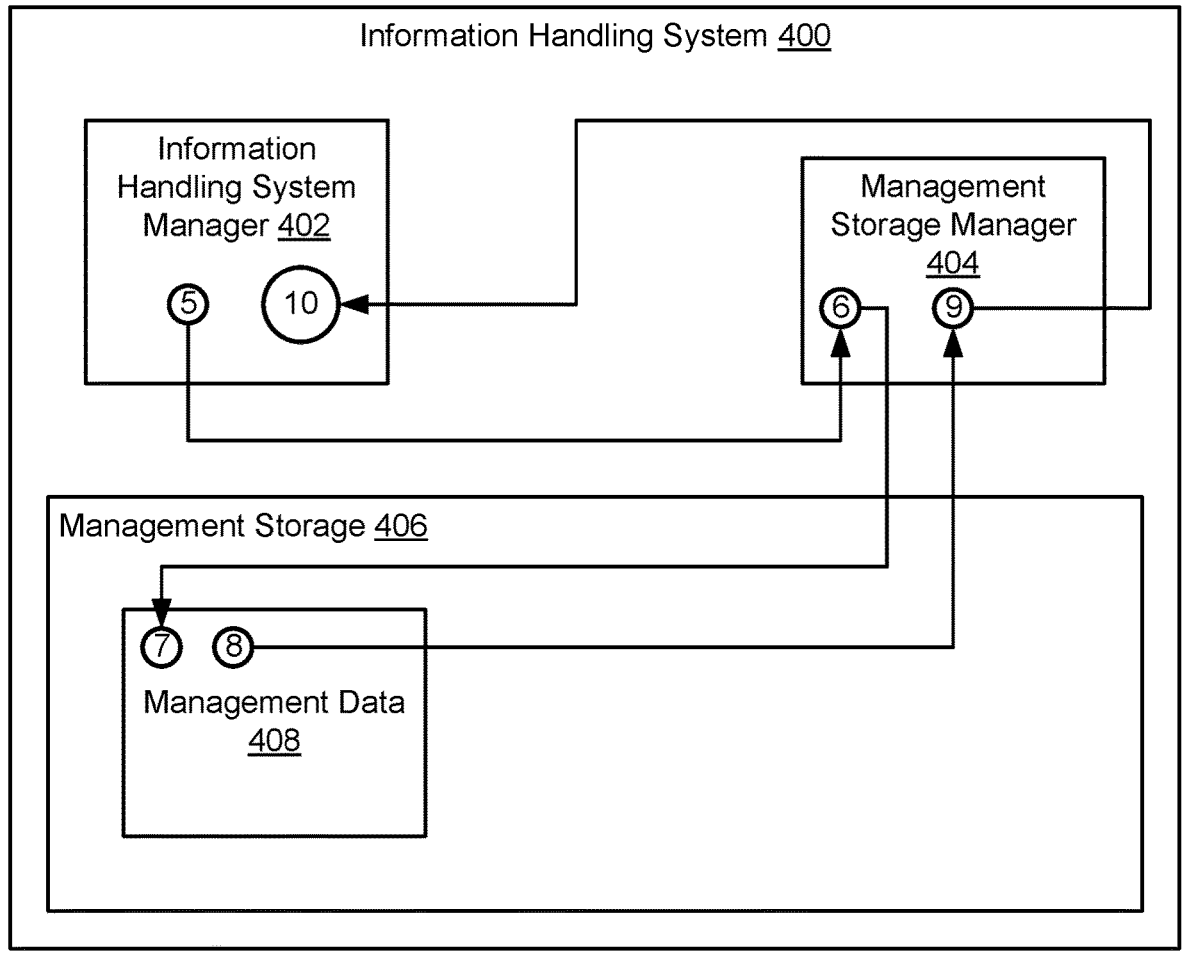
FIG. 4.3

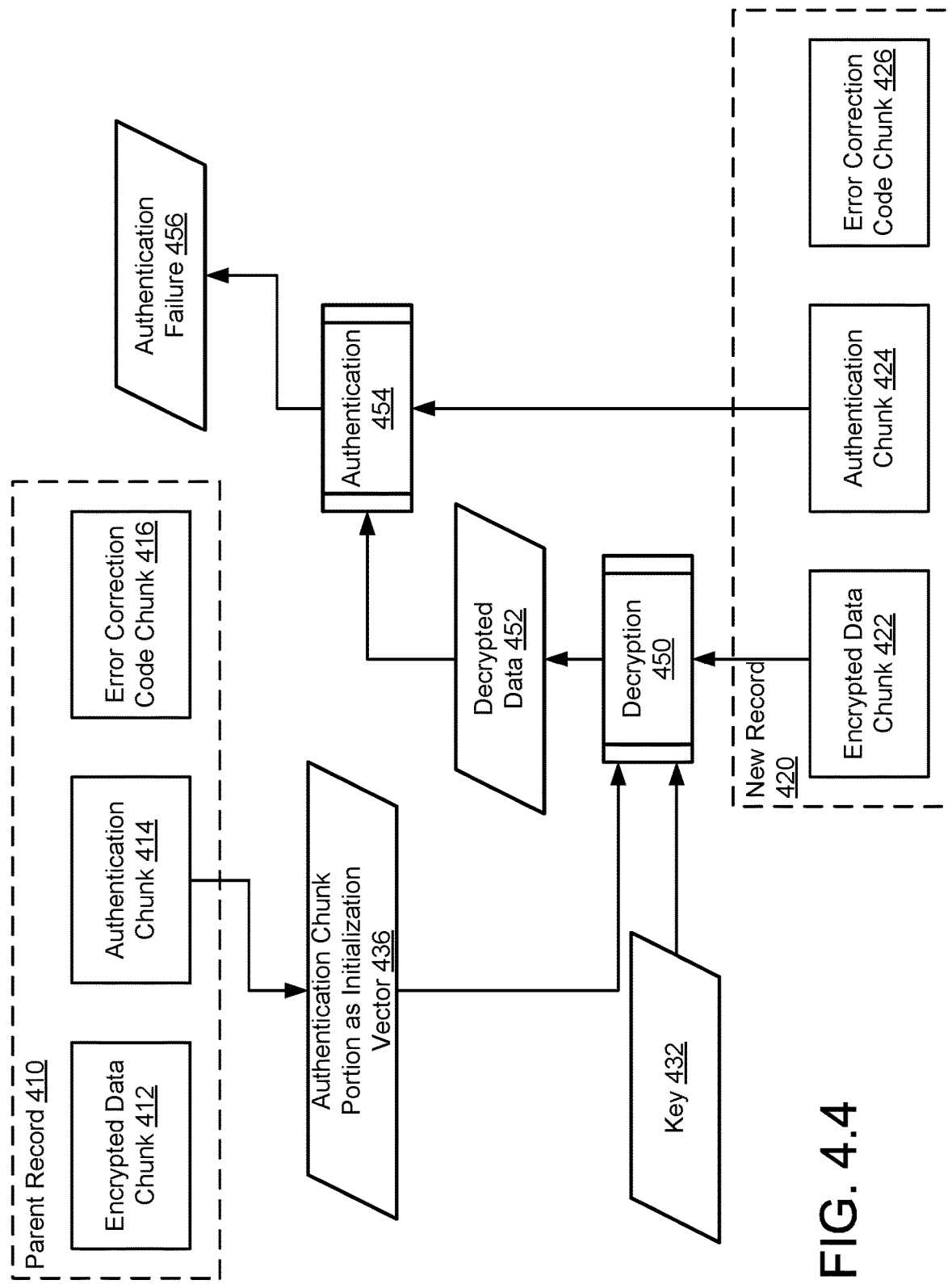
FIG. 4.4

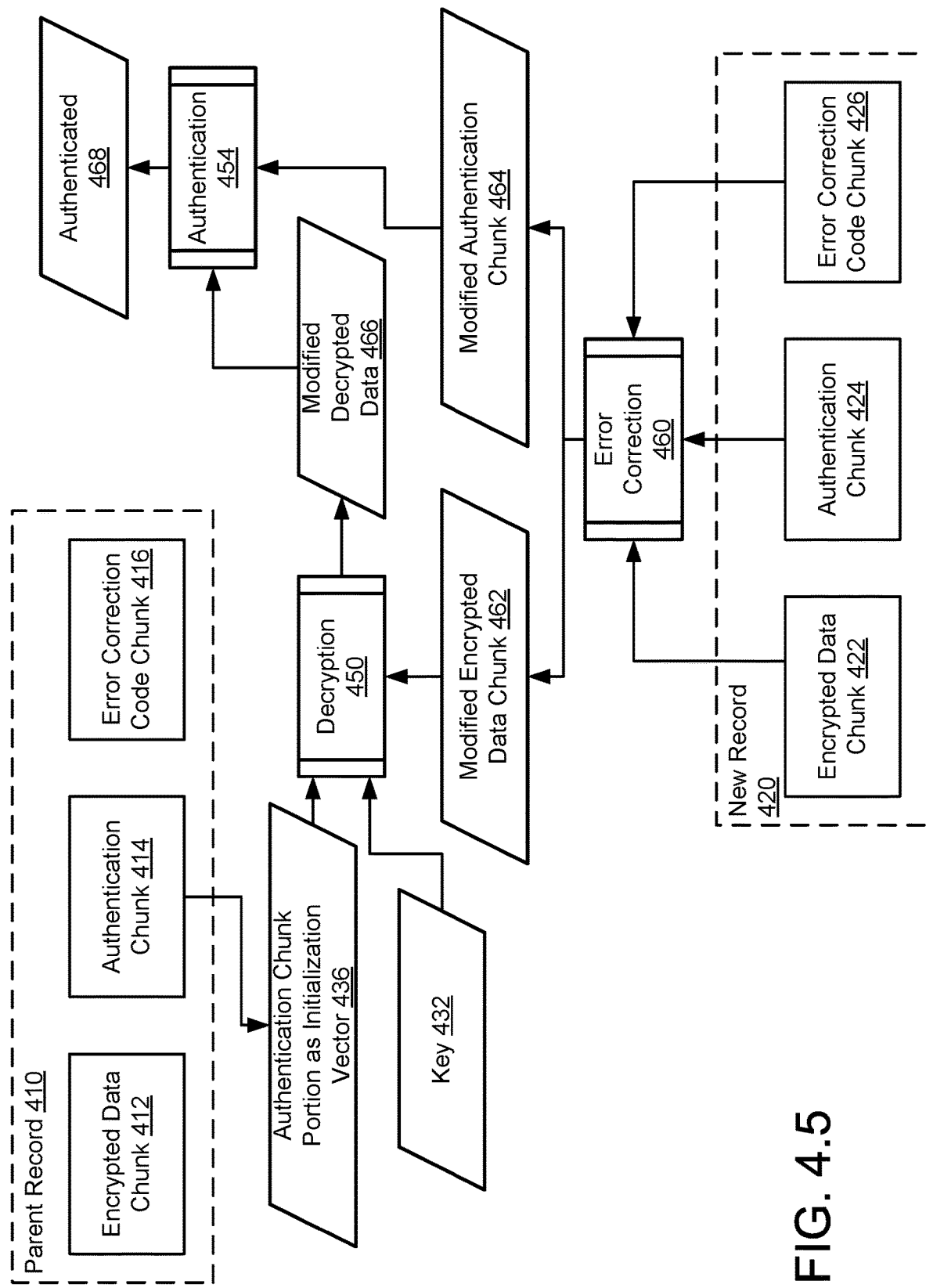
FIG. 4.5

SYSTEM AND METHOD FOR STORING AND READING ENCRYPTED DATA

BACKGROUND

Computing devices may provide services. To provide the services, the computing devices may include hardware components and software components. Data stored in a computing device may be used to boot the computing device thereby enabling the computing device to provide the services.

SUMMARY

In one aspect, an information handling system in accordance with one or more embodiments of the invention includes general storage for storing application data of applications hosted by the information handling system; management storage for storing data used to manage operation of the information handling system; and a management storage manager that obtains data for storage in the management storage; encrypts the data to obtain encrypted data and authentication data for the encrypted data; generates error correction code data for the encrypted data and the authentication data; and stores, as a new record, the encrypted data, the authentication data, and the error correction code data in the management storage.

In one aspect, a method for managing a management storage of an information handling system in accordance with one or more embodiments of the invention includes obtaining data for storage in the management storage; encrypting the data to obtain encrypted data and authentication data for the encrypted data, the authentication data includes a bit sequence usable to determine whether at least one bit of the encrypted data has been changed after being generated; generating error correction code data for the encrypted data and the authentication data, the error correction code data includes a second bit sequence usable for correcting at least one second bit of the encrypted data and authentication data that has been changed after being generated; and storing, as a new record, the encrypted data, the authentication data, and the error correction code data in the management storage.

In one aspect, a non-transitory computer readable medium in accordance with one or more embodiments of the invention includes computer readable program code, which when executed by a computer processor enables the computer processor to perform a method for managing a management storage of an information handling system. The method includes obtaining data for storage in the management storage; encrypting the data to obtain encrypted data and authentication data for the encrypted data, the authentication data includes a bit sequence usable to determine whether at least one bit of the encrypted data has been changed after being generated; generating error correction code data for the encrypted data and the authentication data, the error correction code data includes a second bit sequence usable for correcting at least one second bit of the encrypted data and authentication data that has been changed after being generated; and storing, as a new record, the encrypted data, the authentication data, and the error correction code data in the management storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a flowchart of a method of storing data in accordance with one or more embodiments of the invention.

FIG. 3.2 shows a flowchart of a method of reading data in accordance with one or more embodiments of the invention.

FIGS. 4.1-4.5 shows diagram of the operation of an example system over time in accordance with one or more embodiments of the invention.

DETAILED DESCRIPTION

Figure 1:
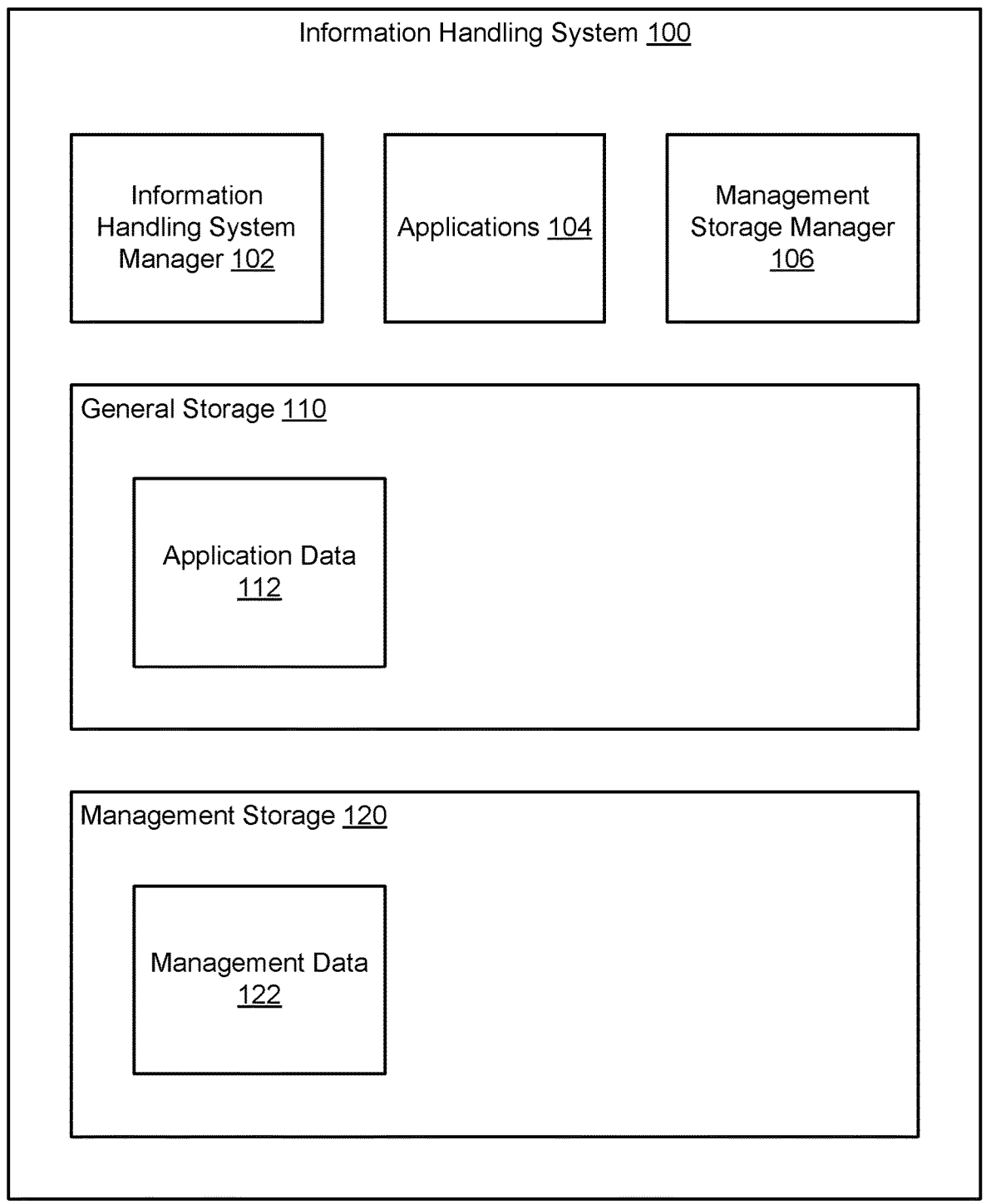
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing data. A system in accordance with embodiments of the invention may store data utilized to manage the system. For example, settings for hardware devices, firmware, software, and/or other types of information may be managed to enable the system to properly operate. Loss of the data may impair the operation of the system. For example, the system may fail to boot, or operate in an undesirable manner, if the data is lost, corrupted, or otherwise rendered unusable (or inaccessible or insecure).

A system in accordance with embodiments of the invention may store data in a manner that makes it more likely to be retrievable in the future. To do so, the system may (i) encrypt the data, (ii) generate authentication data usable to determine whether decrypted data is identical to the data prior to encryption, and/or (iii) generate error correction code (ECC) data for the encrypted data and the authentication data. The encrypted data, authentication data, and ECC data may be stored as a record in storage.

When data stored in a record is read, the system may utilize the authentication data in the record to determine whether the encrypted data and/or authentication data has been subject to an undesired alteration during storage. Data, such as, encrypted data and/or authentication data may be undesirably altered during storage due to, for example, a failure in the storage system/media (e.g., a bit flip), intentional action by a nefarious party (e.g., an attack initiated by a hacker using a virus, malware, or another entity executing on the system), errant writes, etc.

If the encrypted data and/or authentication appears to have been undesirably altered during storage, the system may automatically modify a copy of the encrypted data and/or authentication data in memory using the ECC data. Undesirable alternations may be removed via this process. Consequently, when the modified encrypted data is decrypted, the decrypted data may be identical to the data prior to encryption. Accordingly, data previously stored in storage may be retrieved from storage even when it was undesirably altered during the time it is stored in the storage.

Additionally, when an undesirable alteration is identified, information regarding the undesirable alterations may be stored in memory. In other words, the records in storage may not be immediately corrected upon identification of undesirable modifications. The records may be corrected at later points in time thereby enabling reads of the storage to be appropriately serviced without incurring latency due to record correction processing (or requiring the overall system to immediately be in a specific state required in order to facilitate the correction process).

FIG. 1 shows a system in accordance with one or more embodiments of the invention. The system may include one or more information handling systems (e.g., 100). The information handling system (100) illustrated in FIG. 1 may be representative of the other information handling systems (not shown) of the system.

The information handling system may provide computer implemented services. The computer implemented services may include, for example, database services, data storage services, electronic communications services, and/or other types of services that may be implemented using computing devices.

The information handling system of the system of FIG. 1 may operate independently or cooperatively to provide the computer implemented services. For example, a single information handling system (e.g., 100) may provide a computer implemented service on its own (i.e., independently) while multiple other information handling systems may provide a second computer implemented service cooperatively (e.g., each of the multiple other information handling systems may provide similar and/or different services that form the cooperatively provided service).

To provide computer implemented services, the information handling system (100) may utilize computing resources provided by hardware devices (e.g., processors, special purpose hardware devices, memory modules, storage devices, chipset interconnecting these devices, power supplies, etc.). The computing resources may include, for example, processing resources, storage resources, memory resources, and/or communications resources provided by the hardware devices.

The computing resources may be utilized by applications (104) hosted by the information handling system (100). The information handling system (100) may host any number and/or types of applications (104). Different applications may provide similar or different functionalities. For example, an instant messaging application may provide instant messaging services, a database application may provide database services, etc. Some, or all, of the applications (104) may cooperatively provide services.

To enable the applications (104) to utilize the computing resources of the information handling system (100), the information handling system (100) may include an information handling system manager (102). The information handling system manager (102) may manage the hardware devices of the information handling system (100) and enable the applications (104) to utilize the computing resources provided by the hardware devices. For example, the information handling system manager (102) may place the hardware devices into predetermined states, manage requests for computing resources from the applications (104), and/or otherwise manage the operation of the information handling system (100) in a manner that enables the applications (104) to utilize computing resources of the hardware devices.

To manage the hardware devices of the information handling system (100), the information handling system manager (102) may perform a boot sequence or other management process to place the hardware components of the information handling system (100) into predetermined states. The management process may include, for example, setting operating points, loading information into the hardware devices, and/or otherwise utilizing data to modify the hardware devices to place them in predetermined states.

As used herein, a predetermined state may be a state in which it is known how a hardware device will likely operate. For example, a processor may be placed into a predetermined state by loading computer code into the processor. In another example, a fan may be placed in a predetermined state by driving a predetermined amount of current into the fan thereby causing the fan to generate airflow at a predetermined rate. Hardware devices may be placed into predetermined states when, for example, the information handling system (100) is being started. Hardware devices may be placed into predetermined states at other times during the operation of the information handling system (100) without departing from the invention.

To enable the information handling system manager (102) to place the hardware devices into predetermined states, the information handling system manager (102) may store data used to place the hardware devices into the predetermined states. For example, the information handling system manager (102) may store a data structure including a setting corresponding to a predetermined state for a hardware device. At a future point in time, the information handling system manager (102) may retrieve the stored setting to configure or otherwise modify the operating of the hardware device to place it in the predetermined state.

While described above with respect to storing information relevant for hardware devices, the information handling system manager (102) may store other types of information (e.g., configuration information/settings for software components) for use in managing the operation of the information handling system (100). The information handling system manager (102) may store any type and quantity of management data (122) for managing the operation of the information handling system (100).

The information handling system manager (102) may store management data (122) in a management storage (120). The management storage (120) may be a storage that stores management data (122) and/or other types of data that may need to be available when access to data stored in other storages may be unavailable.

For example, when an information handling system (100) is starting up, it may be unable to access data stored in other storages such as a general storage (110) in which application data (112) generated by applications is stored. To facilitate access to management data (122) during such periods of time, the management storage (120) may be implemented as a high availability storage accessible by the information handling system manager (102). For example, the management storage (120) and data included therein, may be accessible at startup of the information handling system (100), during operation of the information handling system (100), during shutdown of the information handling system (100), etc.

In one or more embodiments of the invention, the management storage may be implemented using a flash storage device directly accessible by a processor of the information handling system (100). For example, the flash storage device may be connected to the processor via a circuit card (e.g., the flash storage device may be implemented as a chip soldered to the mother board and directly accessible by the processor). The flash storage device may be a NOR device capable of persistently storing data.

When data is stored in the management storage (120), the information handling system manager (102) may rely on the accessibility and accuracy of the data in the future. Consequently, if data stored in the management storage (120) is altered due to, for example, improper operation of the management storage (120) that results in bit flips, erasures, or other changes in the stored data, the operation of the information handling system manager (102) may be corrupted. Consequently, the information handling system may be placed in a state where security protocols are violated, the information handling system cannot enter a nominal operating state, etc.

For example, if the information handling system manager (102) stores a setting for a hardware device in the management data (122) and a bit flip occurs in the stored setting, the information handling system manager (102) may set the setting for the hardware device using the bit flipped setting, which may be a value different than previously stored by the information handling system manager (102). Consequently, the hardware device may operate in an undesired manner (e.g., be placed in an unintended state if the data cannot be authenticated).

In general, embodiments of the invention relate to methods, system, and devices for managing management data (122) stored in management storage (120). Embodiments of the invention may provide a method of managing data that (i) enables altered data to be detected, (ii) enables altered data to be reverted to its pre-alteration state, and (iii) if the altered data is unable to be returned to its pre-alteration state, notify an information handling system manager that the previously stored data is unavailable (or corrupt). By doing so, embodiments of the invention may provide an information handling system (100) that is better able to respond to undesired changes in stored management data (122).

By better responding to undesired changes in stored data, the information handling system (100) may be less likely to fail or otherwise become inoperable due to undesired changes in data. Accordingly, an information handling system in accordance with embodiments of the invention may have a higher uptime, may be able to operate in harsher environments that may be more likely to cause undesired data alterations, may have a lower overhead for management of the information handling system, and may reduce a cognitive burden of users of the information handling system by making the operation of the information handling system more transparent to users (e.g., reduce the amount of time users of the information handling system (100) are required to address undesired changes to data).

To provide the above noted functionality, the information handling system (100) may include a management storage manager (106). The management storage manager (106) may manage the storage of data in and retrieval of data from the management storage (120).

To manage the data in the management storage (120), the management storage manager (106) may (i) encrypt data to be stored in the management storage (120), (ii) generate authentication data for the encrypted data that enables undesired changes to the data (e.g., decrypted encrypted data) while stored in the management storage to be detected, (iii) generate error correction code (ECC) data for both the encrypted data and the authentication data, (iv) store the encrypted data, authentication data, and ECC data as a record, and (v) when reading the stored data, use the authentication data to determine if an undesirable alteration has occurred, (vi) if an undesirable change has occurred, attempt to obtain the pre-alteration data using the ECC data, and (vii) if the pre-alteration data cannot be obtained, notify the requesting entity that the pre-alternation data is unavailable (or corrupt). By doing so, the management storage manager (106) may provide requested data from the management storage (120) even if the record in which requested data is stored has been altered.

Figure 2:
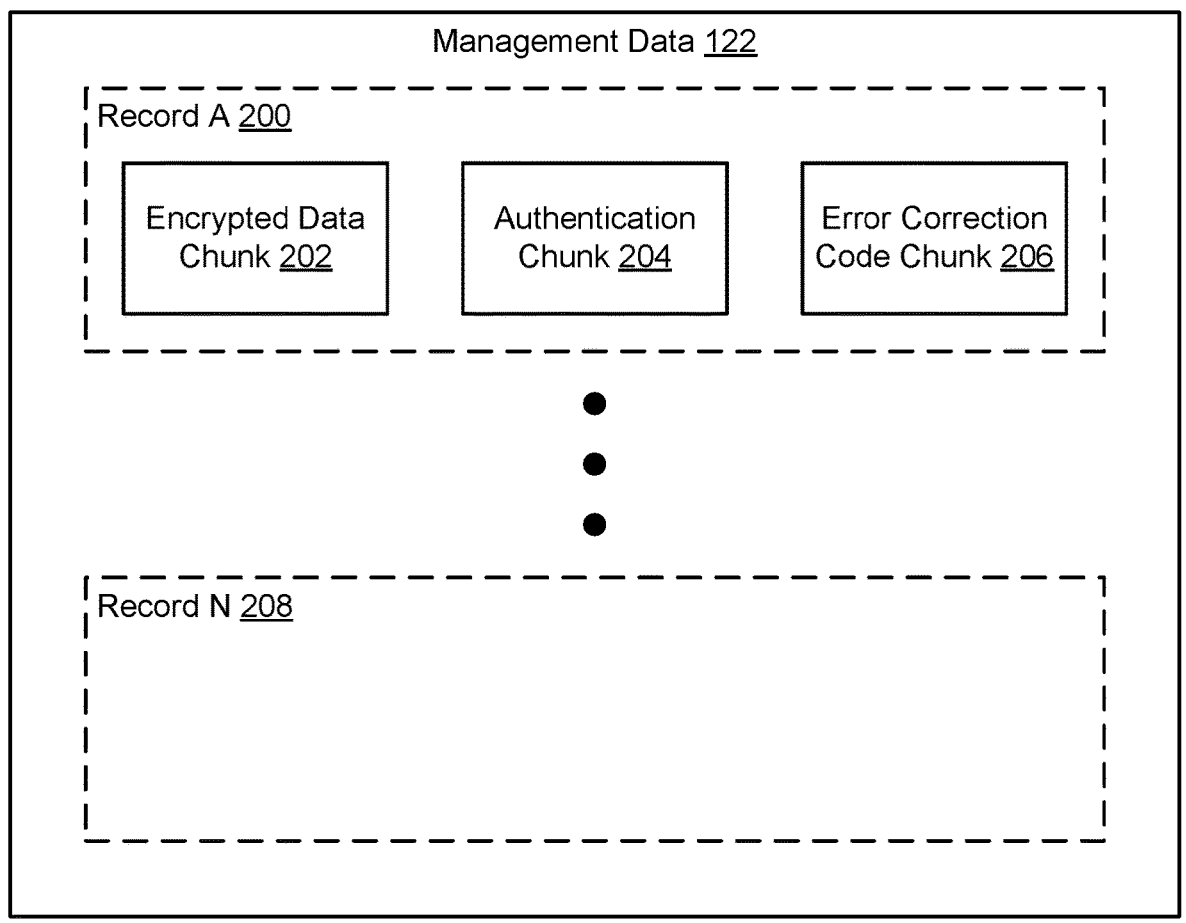
FIG. 2 shows a diagram of management data in accordance with one or more embodiments of the invention.

When providing its functionality, the management storage manager (106) may perform all, or a portion, of the methods illustrated in FIGS. 3.1-3.2. The management storage manager (106) may utilize a data structure as illustrated in FIG. 2 when providing all, or a portion, of its functionality.

The information handling system (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 3.1-3.2. The information handling system (100) may be implemented using other types of computing devices without departing from the invention. For additional details regarding computing devices, refer to FIG. 5.

In one or more embodiments of the invention, the information handling system manager (102), applications (104), and/or management storage manager (106) are implemented using a hardware device including circuitry. The hardware device may be, for example, a digital signal processor, a field programmable gate array, or an application specific integrated circuit. The circuitry may be adapted to cause the hardware device to perform the functionality of the information handling system manager (102), applications (104), and/or management storage manager (106). The information handling system manager (102), applications (104), and/or management storage manager (106) may be implemented using other types of hardware devices without departing from the invention.

In one or more embodiments of the invention, the information handling system manager (102), applications (104), and/or management storage manager (106) are implemented using a processor adapted to execute computing code stored on a persistent storage that when executed by the processor performs the functionality of the information handling system manager (102), applications (104), and/or management storage manager (106). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the general storage (110) is implemented using physical devices that provide data storage services (e.g., storing data and providing copies of previously stored data). The devices that provide data storage services may include hardware devices and/or logical devices. For example, general storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, general storage (110) may include a memory device (e.g., a dual in-line memory device) in which data is stored and from which copies of previously stored data are provided. In another example, general storage (110) may include a persistent storage device (e.g., a solid-state disk drive) in which data is stored and from which copies of previously stored data is provided. In a still further example, general storage (110) may include (i) a memory device (e.g., a dual in-line memory device) in which data is stored and from which copies of previously stored data are provided and (ii) a persistent storage device that stores a copy of the data stored in the memory device (e.g., to provide a copy of the data in the event that power loss or other issues with the memory device impacts its ability to maintain the copy of the data or cause the memory device to lose the data).

The general storage (110) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In one or more embodiments disclosed herein, the management storage (120) is implemented using physical devices that provide data storage services (e.g., storing data and providing copies of previously stored data). The devices that provide data storage services may include hardware devices and/or logical devices. For example, management storage (120) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, management storage (120) may include a memory device (e.g., a dual in-line memory device) in which data is stored and from which copies of previously stored data are provided. In another example, management storage (120) may include a persistent storage device (e.g., a solid-state disk drive) in which data is stored and from which copies of previously stored data is provided. In a still further example, management storage (120) may include (i) a memory device (e.g., a dual-in line memory device) in which data is stored and from which copies of previously stored data are provided and (ii) a persistent storage device that stores a copy of the data stored in the memory device (e.g., to provide a copy of the data in the event that power loss or other issues with the memory device impacts its ability to maintain the copy of the data or cause the memory device to lose the data).

The management storage (120) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or on another hardware device that allocates the storage resources of the physical storage devices.

In one or more embodiments of the invention, the management storage (120) is implemented as a special purpose hardware device. The special purpose hardware device may enable data to be persistently stored. The special purpose hardware device may be implemented using, for example, a solid state storage device (or other type of storage device) operably connected to a processor.

The solid state storage device may be, for example, a flash based storage device. The solid state storage device may be other types of solid state storage devices without departing from the invention. The solid state storage device may have a write rate that is substantially slower than other types of storage devices such as, for example, hard disk drives, solid state disk drives, or other types of devices utilized by the general purpose storage for storing data.

In one or more embodiments of the invention, the solid state storage device may have a read and/or write speed that is between 100 to 1000 times slower than other storage devices used to implement, for example, the general storage (e.g., 110) of the information handling system (100) or other storages used to service nominal operation of the information handling system (e.g., when the information handling system is providing its computer implemented services rather than booting or performing other management functionalities).

In one or more embodiments of the invention, the management storage (120) may only be accessible when the information handling system is placed into a special state during which execution of other processes is suspended. For example, to limit the potential for improper access of the management storage (120), other processes such as the applications (104) may be suspended when records are being stored in the management storage (120). Consequently, reads and/or writes to the management storage (120) may significantly reduce the performance of computer implemented services by the information handling system (100).

Additionally, reads or writes to the management storage (120) may take in excess of 10 milliseconds, thereby creating user-perceptible stuttering of the computer implemented services. For example, perceptible hangs in video playback may occur. Embodiments of the invention may reduce and/or prevent such degradations in the user experience, as will be discussed in greater detail below, by avoiding the mechanisms that lead to such long read and/or write times in encrypted data stored in the management storage (120).

The solid state storage device may be operably connected to the processor through a serial peripheral interface or other interconnect standard. Consequently, the solid state storage device may be highly available for use (in contrast to other storage devices used by the general storage).

While the system of FIG. 1 has been illustrated and described as including a limited number of specific components, a computing device in accordance with embodiments of the invention may include additional, fewer, and/or different components without departing from the invention.

As discussed above, the information handling system manager (102) may store data in and retrieve data from management storage (120). The management storage manager (106) may store the data in the management storage (120) using a predetermined format.

Turning to FIG. 2, FIG. 2 shows a diagram of management data (122) in accordance with one or more embodiments of the invention. The management data (122) may be managed by the management storage manager (106, FIG. 1). The management data (122) may be based on data which the information handling system manager (102, FIG. 1) requested to be store in the management data (122).

As discussed above, the data requested by the information handling system manager (102, FIG. 1) to be stored may be used by the information handling system manager (102, FIG. 1) to manage the operation of the information handling system (100, FIG. 1). To reduce issues arising from undesired alterations to the data, the management storage manager (106, FIG. 1) may store this data in a predetermined format.

The predetermined format may include any number of records (200, 208). All of the records may be linked using parent-child relationships. A child record may be a record that utilizes a portion of a parent record in its generation. Specifically, a child record may be one that utilizes a portion of a parent record to encode data stored in the child record. A parent record may be a record that another record (e.g., a child record) uses to encrypt data stored in the other record. Thus, any of the records may be linked to each other through parent-child relationships.

In some embodiments of the invention, a portion of the storage resources of the management storage are divided into buckets of equal size. The buckets may be sequentially organized in a predetermined address space. One record may be stored in each of the buckets. In such a scenario, parent records may be stored in the bucket having the next highest/lowest address when compared to a bucket in which a new record will be stored. Other methods of organizing the storage resources of the management storage may be utilized without departing from the invention. For example, more complicated arrangements of storage resources may be organized using lookup tables, headers, etc.

Each of the records may include an encrypted data chunk (202), an authentication chunk (204), and an ECC chunk (206). Each of these components is discussed below.

The encrypted data chunk (202) may include data that has been encrypted. The data may be encrypted using any method without departing from the invention.

The data may be encrypted, for example, using the Galois/Counter Mode (GCM). More specifically, the data may be encrypted using an Advanced Encryption Standard Galois/Counter Mode (AES-GCM). The AES-GCM encryption method may utilize a 128, 192, or 256 bit key. In one or more embodiments of the invention, the AES-GCM encryption method utilizes a 256 bit key (AES256-GCM). The invention is not limited to the aforementioned examples.

The encryption method utilized to generate the encrypted data chunk (e.g., 202) may take, as input, data to be encrypted, a key for encrypting the data (e.g., a bit sequence of predetermined length), and an initialization vector (another bit sequence of predetermined length).

The key may be obtained and maintained using any method without departing from the invention. The key may be, for example, a 256-bit sequence obtained in accordance with any encryption standard.

The initialization vector for a record may be obtained using data from a parent record. For example, when a new record is to be generated and stored as part of the management data (122), a portion of the previously stored record may be used to generate the initialization vector. In one or more embodiments of the invention, the initialization vector is generated using a portion of the authentication chunk of the previously stored record (or another record to which the new record will become a child).

For example, the initialization vector may be generated by XORing a portion of the authentication chunk of the previously stored record (e.g., 96 bits of the authentication chunk) with an address (e.g., starting location of the new record in memory) of the new record. The initialization vector may be generated using other methods without departing from the invention. For example, the initialization vector may only be a portion of the authentication chunk of the previously stored record.

By utilizing a portion of an authentication chunk of a parent record to obtain an initialization vector, the total amount of data stored in the management data (122) may be reduced when utilizing other types of data as the initialization vector (e.g., because the authentication chunk of each record will necessarily be stored for authentication purposes, consequently it will be available for decryption purposes additional data corresponding to the initialization vector will not need to be stored in addition to the authentication chunk). Additionally, by utilizing the portion of the authentication chunk as the initialization vector for a child record, the records are effectively chained to one another.

When the data is encrypted, the encryption method may provide, as output, both encrypted data and authentication data that may be used to validate that decrypted data matches the data that was encrypted. In other words, authentication data that may be used to verify that the encrypted data chunk (202) was not altered (e.g., due to a bit flip, activity by a nefarious party, etc.) while encrypted.

The authentication chunk (204) may include the authentication data generated during encryption. Consequently, the authentication chunk (204) may be used to determine whether the encrypted data chunk (202) and/or the authentication chunk (204) was altered after storage in the management storage. The authentication chunk (204) may be implemented as a bit sequence. The bit sequence may be specified by the encryption algorithm used to generate a corresponding encrypted data chunk (202) (e.g., may be the output of an encryption algorithm that operates on to-be-encrypted data).

The ECC chunk (206) may include ECC data (e.g., Hamming code data or other types of correction code usable to correct errors in stored data) for both the encrypted data chunk (202) and the authentication chunk (204). Consequently, the ECC chunk (206) may be used to correct alterations to the encrypted data chunk (202) and/or the authentication chunk (204).

In one or more embodiments of the invention, the ECC chunk (206) includes sufficient ECC data (e.g., 1 byte) to correct a single bit error in every 16 bytes of data of the encrypted data chunk (202) and/or the authentication chunk (204). The ECC chunk (206) may include different amounts of ECC data to correct different bit rate errors (e.g., 2 bits in every 16 bytes of data, 3 bits in every 1 byte of data, . . . etc.) without departing from the invention.

While the management data (122) has been illustrated and described as including a limited amount of specific data, management data in accordance with embodiments of the invention may include different amounts and types of data without departing from the invention. For example, each of the records may include a header that specifies the layout of data within each of the encrypted data chunks (e.g., offsets to different portions of data, descriptions of the different portions of data), a name or identifier of a record, etc. Any of the data structures illustrated in FIG. 2 may be implemented using, for example, lists, tables, linked lists, databases, and/or other types of data structures.

Additionally, for a first record, an initialization record may be generated and used. For example, the initialization record may be a portion of the header or other data structure stored along with the first record.

As discussed above, the system of FIG. 1 may manage data in management storage (120) to reduce the impact of undesired alterations during storage in the management storage. FIGS. 3.1-3.2 show methods that may be performed by components of the system of FIG. 1 to manage data in management storage.

FIG. 3.1 shows a flowchart of a method in accordance with one or more embodiments of the invention. The method depicted in FIG. 3.1 may be performed to store data in management storage in accordance with one or more embodiments of the invention. The method shown in FIG. 3.1 may be performed by, for example, a management storage manager (e.g., 106, FIG. 1). Other components of the system in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, data for storage in management storage is obtained. The data may be obtained from, for example, an information handling system manager (e.g., 102, FIG. 1). The data may include information that will be used by the information handling system manager (e.g., 102, FIG. 1) to manage the operation of and information handling system (e.g., 100, FIG. 1). The data may include any type and quantity of information.

In step 302, an address of a new record in which the data will be stored is obtained. The address may be obtained by, for example, identifying a location of unallocated storage space of a management storage. The location may be an address (e.g., logical block address, offset, etc.) of the start of the unallocated storage space.

For example, the information handling system manager may sequentially allocate the address space of the management storage into records. Consequently, the next larger address space (e.g., if implemented using an ascending address space allocation approach) after the last allocated record may be used as the address for the new record.

In one or more embodiments of the invention, the address is a physical address of the management storage. For example, the information handling system manager may directly manage allocation and use of the storage resources of the management storage.

In some embodiments of the invention, the address may be a logical address if a layer of abstraction for the management storage exists. If a layer of abstraction exists, the address may be obtained from an entity that manages the abstracted physical addressing of the management storage or in accordance with an algorithm that defines how the physical address of the management storage is abstracted.

In step 304, a portion of an authentication chunk of a parent record and a key is obtained. The portion of the authentication chunk may be any record to which the new record will be linked. For example, the parent record may be the last stored (e.g., previously stored) record in the management storage.

The portion of the authentication chunk may be any number of bits of the authentication chunk. For example, the portion of the authentication chunk may be the last X bits of the authentication chunk of the parent record. The number of X bits may correspond to the required lengths of the initialization vector that will be used to encrypt data stored in the new record.

The key may be obtained using any method without departing from the invention. For example, the key may have been obtained to generate previously stored records. The same key, used to encrypt data included in previously stored records, may be used to encrypt the data that will be stored in the new record. The key may be of any length. In one or more embodiments of the invention, the key is a 256-bit key.

In step 306, the data is encrypted using the portion of the authentication chunk, the address, and the key to obtain encrypted data and authentication data for the encrypted data.

The data may be encrypted by generating an initialization vector based on the portion of the authentication chunk. For example, the initialization vector may be the portion of the authentication chunk. In another example, the initialization vector may be based on the portion of the authentication chunk and the address of the new record. The initialization vector may be obtained by XORing the portion of the authentication chunk with the address of the new record. The resulting bit sequence may be used as the initialization vector. By generating the initialization vector based on the portion of the authentication chunk, a parent-child relationship between the new record and the parent record is formed.

The data may be encrypted by providing, as input, the data, the initialization vector, and the key, to an encryption algorithm. The encryption algorithm may provide, as output in response to the input, the encrypted data and the authentication data.

In step 308, ECC data for the encrypted data and the new authentication data is generated. The ECC data may be generated using any algorithm (e.g., Hamming code) without departing from the invention.

In step 310, the new record is stored including the encrypted data, the new authentication data, and the ECC data in the management storage. Specifically, the encrypted data is stored as an encrypted data chunk of the new record, the authentication data is stored as the authentication chunk of the new record, and the ECC data is stored as the ECC chunk of the new record.

The method may end following step 310.

Using the method illustrated in FIG. 3.1, data may be stored in management storage in a manner that reduces its susceptibility to corruption or loss due to undesired modifications during storage.

Turning to FIG. 3.2, FIG. 3.2 shows a flowchart of a method in accordance with one or more embodiments of the invention. The method depicted in FIG. 3.2 may be performed to read data stored in management storage in accordance with one or more embodiments of the invention. The method shown in FIG. 3.2 may be performed by, for example, a management storage manager (e.g., 106, FIG. 1). Other components of the system in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 320, a read request for a record is obtained. The read request may be obtained from an information handling system manager or another entity. The read request may specify data stored in the record.

In step 322, a portion of an authentication chunk of a parent record for the record is obtained. The portion of the authentication chunk may have been used to generate an initialization vector used to encrypt an encrypted data chunk of the record.

In step 324, the data is decrypted using the encrypted data chunk of the record, the portion of the authentication chunk, and a key.

The key may have been used to encrypt the data stored in records in the management storage.

The portion of the authentication chunk may be used to obtain the initialization vector used to encrypt the data stored in the encrypted data chunk.

The data may be decrypted by, providing as input, the encrypted data chunk, the initialization vector, and the key to a decryption function of an encryption algorithm. The decryption function may provide the decrypted data as output in response to the input.

In step 326, it is determined whether the decrypted data is authentic. The determination may be made using the authentication chunk. For example, the determination may be made by providing, as input, the decrypted data and the authentication data included in the authentication chunk to an authentication function of the encryption algorithm used to encrypt the encrypted data chunk. The function may provide, as output, an indication of whether the decrypted data matches the data that was encrypted to obtain the encrypted data chunk. If the decrypted data does not match the data, the determination is made that the decrypted data is not authentic.

If it is determined that the decrypted data is not authentic, the method may proceed to step 330. If it is determined that the decrypted data is authentic, then the method may proceed to step 328.

In step 328, the read request is serviced using the decrypted data. The read request may be serviced by providing all, or a portion, of the decrypted data to the requesting entity in response to the read request. For example, the read request may only request a portion of the data included in the decrypted data.

The method may end following step 328.

Returning to step 326, the method may proceed to step 330 following step 326 if it is determined that the decrypted data is not authentic.

In step 330, ECC data of the record is used to obtain a modified encrypted data chunk for the record and a modified authentication chunk for the record. As discussed above, the ECC data may be used to identify undesired changes to the encrypted data chunk and/or authentication chunk of a record. Copies of the encrypted data chunk and authentication chunk of the record may be stored in memory and then modified (e.g., corrected) using the ECC data. Any algorithm for using ECC data to correct data may be used to modify the encrypted data chunk and authentication chunk in memory without departing from the invention.

In one or more embodiments of the invention, the encrypted data chunk and authentication chunk in management storage are not modified upon identification of potential undesired modifications. Rather, these undesired modifications may be stored in memory for future use and/or aggregated with other undesired modifications to other records. As noted above, the write speed to the management storage may be limited. Consequently, while the management storage is being utilized, the record may not be updated based on identified undesirable changes, but may be tracked in memory for future correction. By doing so, access speed for the management storage may be maintained while it is being used for purposes other than correction of undesirable changes to stored data.

In step 332, modified decrypted data is obtained using the modified encrypted data chunk, the portion of the authentication chunk, and the key. For example, a decryption process similar to that discussed with respect to step 324 may be utilized. However, the modified encrypted data chunk rather than the data chunk may be used as input to the decryption function. The output of the decryption function may be the modified decrypted data.

In step 334, it is determined whether the modified decrypted data is authentic. The determination may be made using the modified authentication chunk. For example, the determination may be made by providing, as input, the modified decrypted data and modified authentication data included in the modified authentication chunk to an authentication function of the encryption algorithm used to encrypt the encrypted data chunk. The authentication function may provide, as output, an indication of whether the modified decrypted data matches the data that was encrypted to obtain the encrypted data chunk. If the modified decrypted data does not match the data, the determination is made that the modified decrypted data is not authentic.

If it is determined that the modified decrypted data is not authentic, the method may proceed to step 338. If it is determined that the modified decrypted data is authentic, then the method may proceed to step 336.

In step 336, the read request is serviced using the modified decrypted data. The read request may be serviced by providing all, or a portion, of the modified decrypted data to the requesting entity in response to the read request. For example, the read request may only request a portion of the data included in the modified decrypted data.

The method may end following step 336.

Returning to step 334, the method may proceed to step 338 following step 334 if it is determined that the modified decrypted data is not authentic.

In step 338, it is indicated that the read request is unserviceable. For example, a response to the read request may be sent that indicates that the data requested as part of the read request of step 320 is not available, has been corrupted, etc.

In one or more embodiments of the invention, information indicating that the encrypted data stored in the management storage is unreadable may be stored for future use. The information may be stored as part of a data structure. The data structures may be stored, for example, in memory, in the management storage, in general storage, and/or other storages. (e.g., more than one copy of the information may be stored in more than one data structure). The data structures may be any type of data structure (e.g., a text file, a table, unstructured data, a database, etc.).

The stored information may be used, for example, to service future read requests. If another read request for the same record (e.g., the one indicated by the read request of step 320) is received, the stored information may be used to immediately service the request rather than performing steps 322, 324, 326, 330, 332, and 334. For example, the information may be stored as part of a lookup table. When a read request for a record is received, the information in the read request may be matched against the information and/or other information to ascertain whether the record is unreadable.

In one or more embodiments of the invention, information indicating that security of the information handling system may be compromised may be stored. The information may be stored as part of a data structure. The data structures may be stored, for example, in memory, in the management storage, in general storage, and/or other storages. (e.g., more than one copy of the information may be stored in more than one data structure). The data structures may be any type of data structure (e.g., a text file, a table, unstructured data, a database, etc.).

The stored information may be used, for example, to manage the security of the information handling system. If such information is stored following performance of the method illustrated in FIG. 3.2, the information may serve as a trigger or otherwise cause system security remediation procedures to be implemented. One method of compromising the security of the information handling system may be to modify the manner in which the information handling system operates by modifying the information stored in the records of the management storage. For example, a party may load software onto the information handling system that modifies a record which includes data that could cause the information handling system to operate in a manner (e.g., prevent security software from being loaded, modify privilege/access settings, etc.) that allows the party to, for example, obtain information stored in the information handling system. By storing the information regarding the compromised security of the information handling system, the information handling system proactively takes action to remediate its compromised security.

In one or more embodiments of the invention, storing the information regarding compromised security of the information handling system may occur when the security of the information handling system has not been compromised. For example, when data stored in a record is determined as not being authentic, it does not necessarily mean that another party has attempted to compromise the security of the information handling system. As noted above, bit flips or other types of undesirable operation of the information handling system may cause information stored in a record to be modified in an inadvertent manner. Consequently, when information is stored indicating that the security of the information handling system is compromised, the stored information may only indicate that the security of the information handling system is potentially compromised (rather than being an absolute indicator that the security of the information handling system is compromised). Consequently, if information indicating that the security of the information handling system is compromised, the subsequent remediation action by the information handling system may be tailored to remediating a potential security issue rather than a known security issue.

The method may end following step 338.

Using the method illustrated in FIG. 3.2, undesired changes to previously stored data may be identified. By identifying the undesired changes, the data that was actually requested may be provided rather data that included undesired changes (e.g., changes due to bit flips, unauthorized changes by nefarious parties, etc.).

Additionally, using the method illustrated in FIG. 3.2, information regarding undesired changes to data in management storage may be aggregated in memory. The changes may then be used to update records stored in the management storage during periods of time where the management storage is not being used.

Further, the information regarding undesired changes to data in management storage stored in memory (e.g., memory of the information handling system) may be used to service subsequent read requests. For example, when an undesired change is identified, a data structure stored in memory may be updated to reflect that a record stored in management storage is in an error state and that a corrected record may be temporarily stored in memory. Consequently, when a subsequent read request for a record in error is received, it may be serviced using modified decrypted chunks and/or modified authentication chunks stored in memory. By doing so, steps 322-330 may be avoided for subsequent reads of the records that include undesired alterations/modification.

To further clarify embodiments of the invention, a non-limiting example is provided in FIGS. 4.1-4.5. FIGS. 4.1 and 4.3 show a system similar to that illustrated in FIG. 1. FIGS. 4.2 and 4.4-4.5 illustrate interactions between components and/or actions performed by the components of the system of FIGS. 4.1 and 4.3 over time. For the sake of brevity, only a limited number of components of the system of FIG. 1 are illustrated in each of FIGS. 4.1-4.5.

Example

Consider a scenario as illustrated in FIG. 4.1 in which an information handling system (400) is operating. To manage its operation, the information handling system (400) includes an information handling system manager (402).

At a first point in time, the information handling system manager (402) determines that a setting to a processor (not shown) should be modified. The information handling system manager (402) modifies the setting and then, in step 1, generates a write request for the setting and provides the write request to a management storage manager (404).

In response to receiving the write request, the management storage manager (404) in step 2, determines that a new record for the setting should be generated. In response to the determination, in step 3, the management storage manager (404) generates a write request including the new record and sends it to a management storage (406) for storage as part of management data (408).

In step 4, the management storage (406) stores the new record at a location specified by the management storage manager.

The new record, stored in the management data (408), includes multiple portions.

Turning to FIG. 4.2, FIG. 4.2 shows a diagram of how the new record (420) was generated. The new record includes an encrypted data chunk (422), an authentication chunk (424), and an ECC chunk (426).

To generate the encrypted data chunk (422), an initialization vector (442) was obtained. To obtain the initialization vector (442), an authentication chunk portion (436) from a parent record (410) was obtained. In this case, the parent record (410) was the last stored record in the management data, but the parent record could have been other records previously stored in the management data.

The parent record (410) includes an encrypted data chunk (412), an authentication chunk (414), and an error correction code chunk (416). The authentication chunk portion (436) is a portion of the authentication chunk (414). In this example, the last 96 bits of the authentication chunk (414).

The authentication chunk portion (436) and a new record address (438) of the new record (420) are put through an initialization vector generation (440) process to obtain the initialization vector (442). In this case, the authentication chunk portion (436) is XORed with the new record address (438) thereby forming a 96 bit sequence that is unique (when compared to initialization vectors used to generate other records stored in management storage).

After the initialization vector (442) is obtained, an encryption (434) process is performed using the data (430) (i.e., the setting), a key (432), and the initialization vector (442) as input.

The encryption (434) process generates, as output, the encrypted data chunk (422) and the authentication chunk (424) of the new record. These chunks are written to the new record (420) and used as input to an ECC generation (444) process. The output of the ECC generation (444) process is the ECC chunk (426), which is also written to the new record (420).

Turning to FIG. 4.3, after the new record is stored in the management data (408), the information handling system (400) reboots. As part of the boot process, the information handling system manager (402) needs the setting to start up the processor of the information handling system (400).

To obtain the setting, the information handling system manager (402) generates a read request for the setting in step 5 and sends the read request to the management storage manager (404). In response to receiving the read request, the management storage manager (404), in step 6, identifies that the setting is stored in the new record. In step 6, the management storage manager generates a read for the new record and sends it to the management storage (406).

In step 7, the management storage (406) identifies the new record and reads the new record. In step 8, the management storage (406) provides a copy of the new record to the management storage manager (404) (e.g., by storing it in memory accessible by the management storage manager (404)).

In step 9, the management storage manager (404) obtains the setting using the new record and provides the setting to the information handling system manager (402) in response to the read request.

In step 10, the information handling system manager (402) uses the setting to modify the operation of the processor thereby enabling the processor to be utilized.

Turning to FIG. 4.4, FIG. 4.4 shows a first diagram of how the setting was obtained using the new record (420). First, the encrypted data chunk (422) is decrypted using a decryption (450) process. The encrypted data chunk (422), key (432), and authentication chunk portion (436) are used as inputs to the decryption (450) process, which results in the generation of decrypted data (452).

The decrypted data (452) is then put through an authentication (454) process using the decrypted data (452) and the authentication chunk (424) included in the new record (420). However, as seen in FIG. 4.4, the authentication (454) process resulted in an authentication failure (456), which indicated that, during storage, an undesired change to the encrypted data chunk (422) and/or authentication chunk (424) was made.

Turning to FIG. 4.5, shows a first diagram of how the setting is obtained using the new record (420). After identifying the authentication failure, the encrypted data chunk (422) and authentication chunk (424) are put through an error correction (460) process using the ECC chunk (426) results in the generation of a modified encrypted data chunk (462) and a modified authentication chunk (464). Both modified chunks are stored in memory (e.g., not used to update the new record (420) immediately).

Once generated, the modified encrypted data chunk (462) is put through a decryption (450) process using the authentication chunk portion (436) and the key (432) to obtain modified decrypted data (466). The modified decrypted data (466) is then put through an authentication (454) process using the modified authentication chunk (464). In this example, the result of the authentication (454) process indicates that the modified decrypted data (466) has been authenticated. Consequently, it is treated as the setting requested by the read request and provided to the information handling system manager in response to the read request.

End of Example

Thus, as illustrated in FIGS. 4.1-4.5, embodiments of the invention may provide a system that enables data to be retrieved from storage even when it has been undesirably altered during storage.

Figure 5:
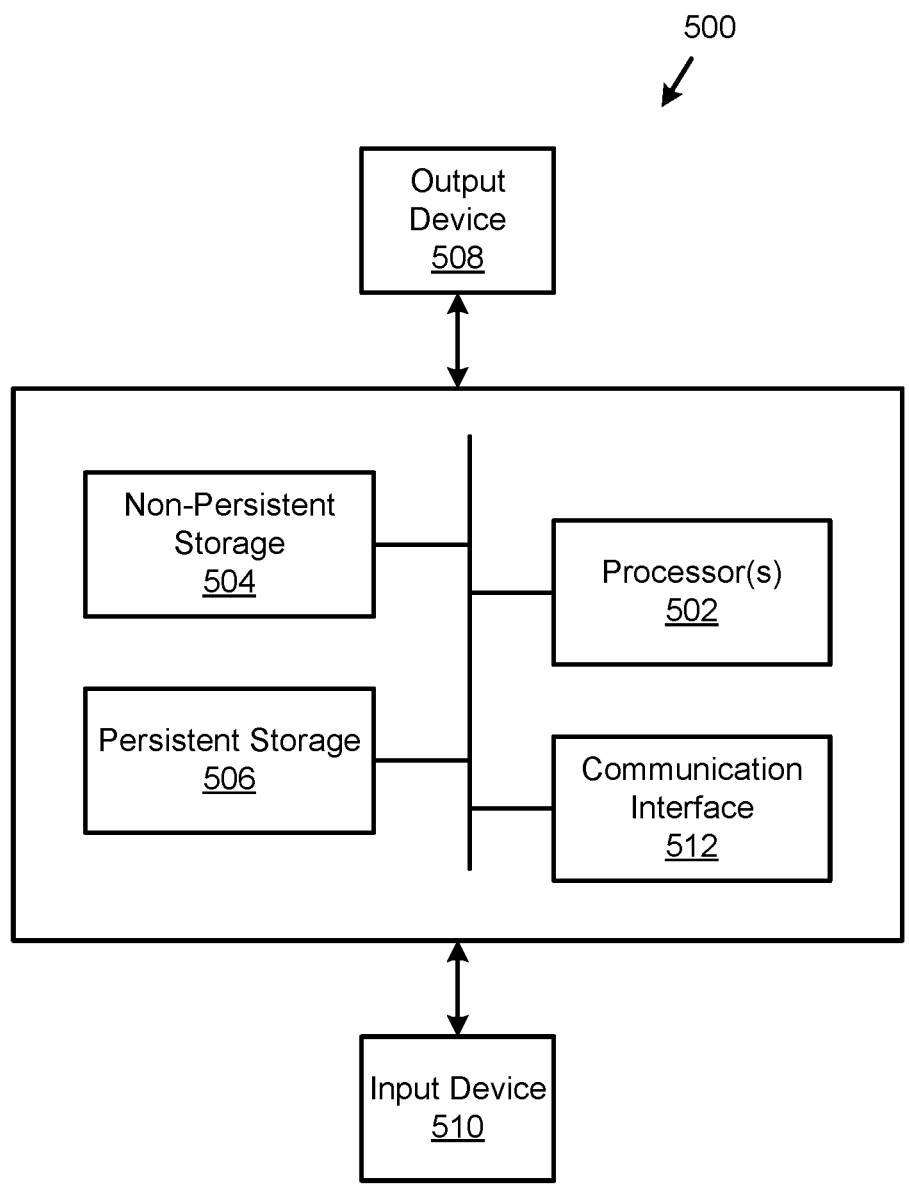
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512)

may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for managing data. Specifically, embodiments of the invention may provide a system for managing data that enables data to be retrieved even when it is undesirably modified during storage.

Thus, embodiments of the invention may address the problem of undesired alterations to data during storage. For example, data may be altered during storage due to bit flips or other failures of the storage system and/or changes by a nefarious party (e.g., a hacker, virus, etc.).

The problems discussed above should be understood as being examples of problems solved by embodiments of the invention, and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system, comprising:
general storage for storing application data of applications hosted by the information handling system;
management storage for storing management data used to manage operation of the information handling system; and
a management storage manager programmed to:
obtain data for storage in the management storage;
encrypt the data to obtain encrypted data and authentication data for the encrypted data, wherein encrypting the data comprises:
obtaining a portion of second authentication data of a parent record to the new record; and
generating the encrypted data and the authentication data using the portion of the second authentication data to obtain an initialization vector for an encryption algorithm that provides the encrypted data;
generate error correction code data for the encrypted data and the authentication data; and
store, as a new record, the encrypted data, the authentication data, and the error correction code data in the management storage as part of the management data.

2. The information handling system of claim 1, wherein the management storage manager is further programmed to:
obtain a read request for the new record;
decrypt the encrypted data to obtain decrypted data;
make a determination, using the authentication data, that the decrypted data does not match the data; and
in response to the determination:
obtain corrected encrypted data using the error correction code data;
obtain corrected authentication data using the error correction code data;
decrypt the corrected encrypted data to obtain second decrypted data;
make a second determination, using the corrected authentication data, that the second decrypted data matches the data; and
service the read request using the second decrypted data based on the second determination.

3. The information handling system of claim 2, wherein the management storage manager is further programmed to:
in response to the second determination:
store a copy of the corrected authentication data and a copy of the corrected encrypted data in memory.

4. The information handling system of claim 3, wherein the management storage manager is further programmed to:
after storing the corrected authentication data and the corrected encrypted data in memory:
obtain a second read request for the new record;
in response to receiving the second read request:
read the copy of the corrected authentication data and the copy of the corrected encrypted data in memory;
decrypt the copy of the corrected encrypted data to obtain third decrypted data; and
service the second read request using the third decrypted data,
wherein the new record is not modified between when the determination is made and the second read request is serviced.

5. The information handling system of claim 4, wherein the management storage manager is further programmed to:
after servicing the second read request:
update the new record using the copy of the corrected encrypted data and the copy of the corrected authentication data.

6. The information handling system of claim 1, wherein the data used to manage the operation of the information handling system is used to boot the information handling system.

7. A method for managing a management storage of an information handling system, comprising:
obtaining data for storage in the management storage;
encrypting the data to obtain encrypted data and authentication data for the encrypted data, wherein the authentication data comprises a bit sequence usable to determine whether at least one bit of the encrypted data has been changed after being generated, wherein encrypting the data comprises:
obtaining a portion of second authentication data of a parent record to the new record; and
generating the encrypted data and the authentication data using the portion of the second authentication data to obtain an initialization vector for an encryption algorithm that provides the encrypted data;

generating error correction code data for the encrypted data and the authentication data, wherein the error correction code data comprises a second bit sequence usable for correcting at least one second bit of the encrypted data and authentication data that has been changed after being generated; and storing, as a new record, the encrypted data, the authentication data, and the error correction code data in the management storage as part of management data used to manage operation of the information handling system.

8. The method of claim 7, further comprising:
obtaining a read request for the new record;
decrypting the encrypted data to obtain decrypted data;
making a determination, using the authentication data, that the decrypted data does not match the data; and
in response to the determination:
  obtaining corrected encrypted data using the error correction code data;
  obtaining corrected authentication data using the error correction code data;
  decrypting the corrected encrypted data to obtain second decrypted data;
  making a second determination, using the corrected authentication data, that the second decrypted data matches the data; and
  servicing the read request using the second decrypted data based on the second determination.

9. The method of claim 8, further comprising:
in response to the second determination:
  storing a copy of the corrected authentication data and a copy of the corrected encrypted data in memory.

10. The method of claim 9, further comprising:
after storing the corrected authentication data and the corrected encrypted data in memory:
  obtaining a second read request for the new record;
  in response to obtaining the second read request:
    reading the copy of the corrected authentication data and the copy of the corrected encrypted data in memory;
    decrypting the copy of the corrected encrypted data to obtain third decrypted data; and
    servicing the second read request using the third decrypted data,
  wherein the new record is not modified between when the determination is made and the second read request is serviced.

11. The method of claim 10, further comprising:
after servicing the second read request:
  updating the new record using the copy of the corrected encrypted data and the copy of the corrected authentication data.

12. The method of claim 7, wherein the new record is used to boot the information handling system.

13. A non-transitory computer readable medium comprising computer readable program code, which when executed by a computer processor enables the computer processor to perform a method for managing a management storage of an information handling system, the method comprising:
obtaining data for storage in the management storage;
encrypting the data to obtain encrypted data and authentication data for the encrypted data, wherein the authentication data comprises a bit sequence usable to determine whether at least one bit of the encrypted data has been changed after being generated, wherein encrypting the data comprises:
  obtaining a portion of second authentication data of a parent record to the new record; and
  generating the encrypted data and the authentication data using the portion of the second authentication data to obtain an initialization vector for an encryption algorithm that provides the encrypted data;
generating error correction code data for the encrypted data and the authentication data, wherein the error correction code data comprises a second bit sequence usable for correcting at least one second bit of the encrypted data and authentication data that has been changed after being generated; and
storing, as a new record, the encrypted data, the authentication data, and the error correction code data in the management storage as part of management data used to manage operation of the information handling system.

14. The non-transitory computer readable medium of claim 13, wherein the method further comprises:
obtaining a read request for the new record;
decrypting the encrypted data to obtain decrypted data;
making a determination, using the authentication data, that the decrypted data does not match the data; and
in response to the determination:
  obtaining corrected encrypted data using the error correction code data;
  obtaining corrected authentication data using the error correction code data;
  decrypting the corrected encrypted data to obtain second decrypted data;
  making a second determination, using the corrected authentication data, that the second decrypted data matches the data; and
  servicing the read request using the second decrypted data based on the second determination.

15. The non-transitory computer readable medium of claim 14, wherein the method further comprises:
in response to the second determination:
  storing a copy of the corrected authentication data and a copy of the corrected encrypted data in memory.

16. The non-transitory computer readable medium of claim 15, wherein the method further comprises:
after storing the corrected authentication data and the corrected encrypted data in memory:
  obtaining a second read request for the new record;
  in response to receiving the second read request:
    reading the copy of the corrected authentication data and the copy of the corrected encrypted data in memory;
    decrypting the copy of the corrected encrypted data to obtain third decrypted data; and
    servicing the second read request using the third decrypted data,
  wherein the new record is not modified between when the determination is made and the second read request is serviced.

17. The non-transitory computer readable medium of claim 16, wherein the method further comprises:
after servicing the second read request:
  updating the new record using the copy of the corrected encrypted data and the copy of the corrected authentication data.

* * * * *